Patented Sept. 2, 1924.

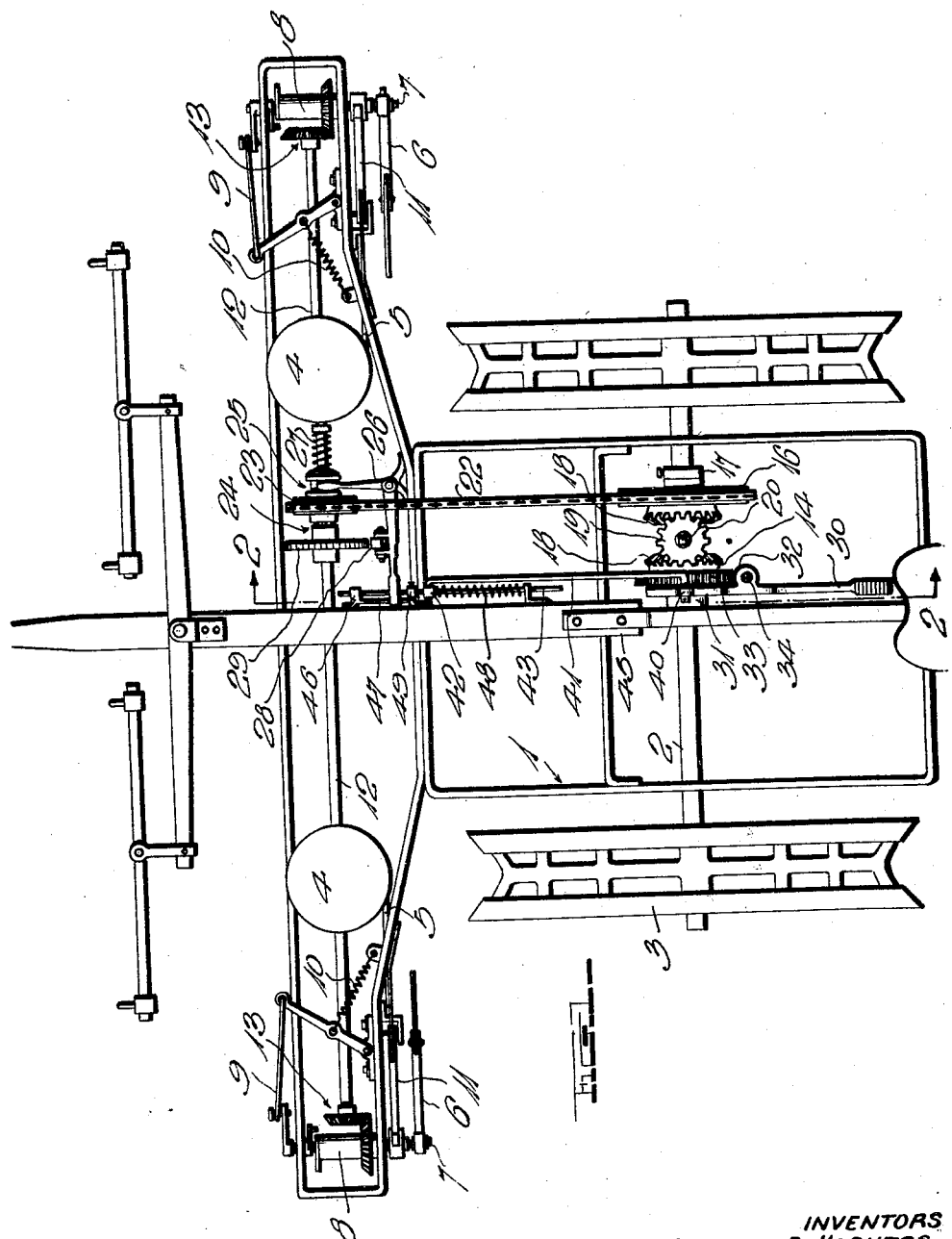

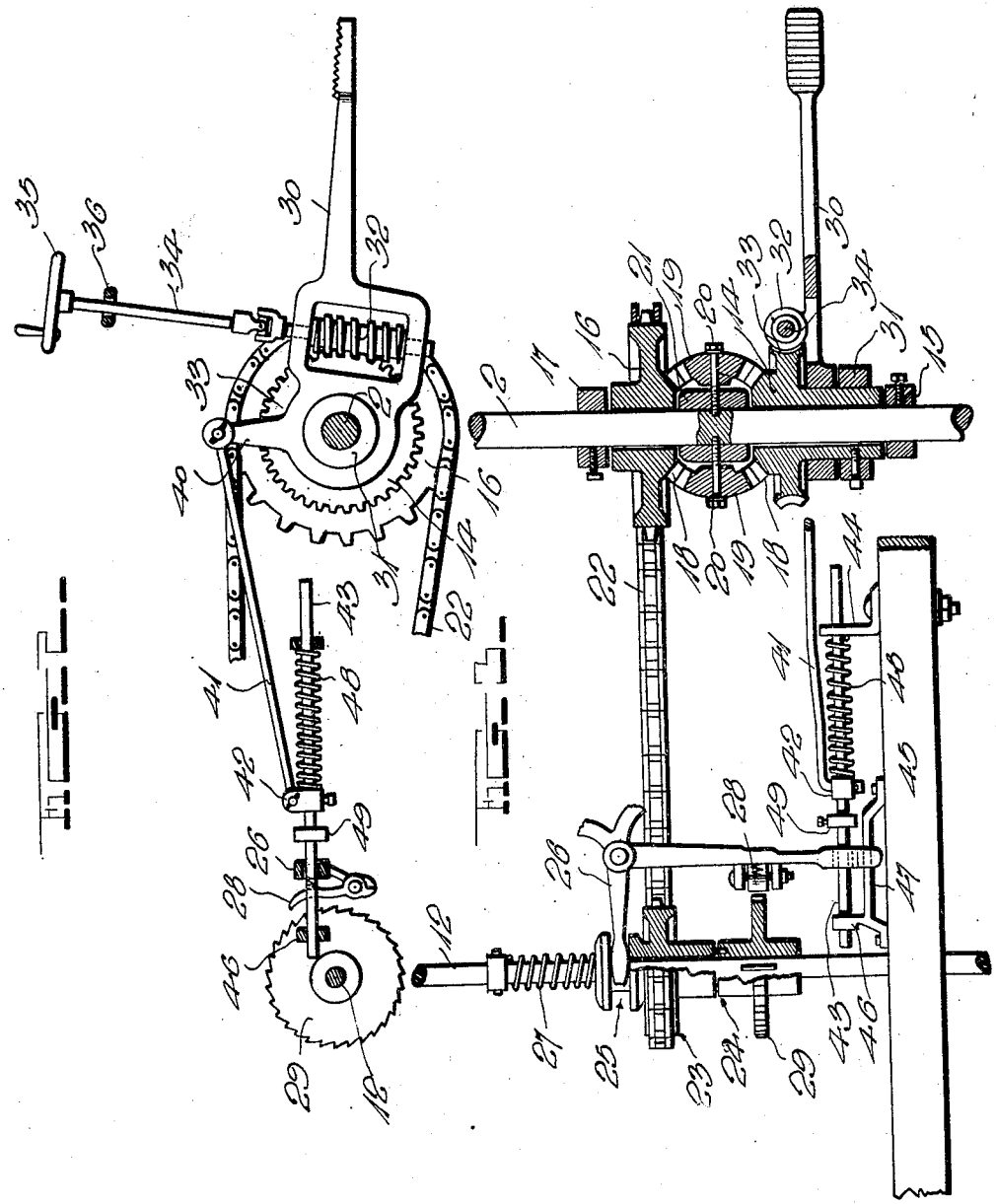

1,507,480

UNITED STATES PATENT OFFICE.

CHARLES D. HARNESS AND CHARLES D. BRADSHAW, OF LUCASVILLE, OHIO.

MARKER-SHAFT-DRIVING MECHANISM FOR CORN PLANTERS.

Application filed April 23, 1923. Serial No. 634,060.

*To all whom it may concern:*

Be it known that we, CHARLES D. HARNESS and CHARLES D. BRADSHAW, citizens of the United States, residing at Lucasville, in the county of Scioto and State of Ohio, have invented certain new and useful Improvements in Marker-Shaft-Driving Mechanism for Corn Planters; and we do declare the following to be a full, clear, and exact description of the invention, such as will enable others skilled in the art to which it appertains, to make and use the same.

Our invention relates to improvements in driving and controlling mechanism for a shaft which is to be rotated at times, held against rotation at other times, and either advanced or retarded for any desired purpose and we have shown the invention in connection with the marker operating shaft of a corn planter, of the type disclosed in our U. S. Patent No. 1,420,923, of June 27, 1922.

One object of the invention is to provide a novel easily controlled mechanism for either advancing or retarding the marker shaft as occasion may require, to properly aline the markers with marks made by a previous trip across the field.

A further object is to provide a unique clutch mechanism for controlling the rotation of the marker shaft and to connect this clutch mechanism with a controlling device of the above mentioned advancing and retarding means, permitting the single control device to operate both mechanisms.

A still further object is to provide for positively holding the market shaft against turning under the influence of the marker actuating springs, when the clutch is thrown out.

With the foregoing in view, the invention resides in the novel subject matter hereinafter described and claimed, the description being supplemented by the accompanying drawings.

Figure 1 is a top plan view of a corn planter showing the application of our invention thereto.

Figure 2 is an enlarged longitudinal sectional view on line 2—2 of Fig. 1.

Figure 3 is an enlarged fragmentary plan view, partly in horizontal section.

In the drawings above briefly described, the numeral 1 designates the frame of a corn planter having the usual axle 2 supported and driven by wheels 3, said frame being provided with the well known seed hoppers 4 and with slide valves 5 which control the dropping of seed therefrom. The numerals 6 designate a pair of marking arms mounted on short shafts 7 which extend longitudinally of the machine at the outer corners of its front portion, said shafts 7 being surrounded by a pair of driven sleeves 8 which turn said shafts to a predetermined extent. By means of suitable connections 9, the shafts 7 are connected with springs 10 which immediately complete the rotation of said shafts, after these shafts have been turned to a predetermined extent by the sleeves 8, thereby quickly operating the marking arms 6. At 11, we have indicated operating means for the valves 5, controlled by the shafts 7, so that the seed dropping operations and the movement of the marker arms 6 will be properly synchronized.

The numeral 12 designates a transverse shaft suitably geared at its ends to the sleeves 8 for driving the latter as indicated by the numerals 13. It is to control the movement of this shaft, that we have provided the present invention, fully described below. For a thorough understanding of the features of construction so far briefly mentioned, reference may be made to our prior patent above referred to.

A relatively stationary hub member 14 is loosely mounted on the axle 2 and is held against movement in one direction by a suitable collar or the like 15, while a freely rotatable sprocket wheel 16 is also rotatable on said axle in spaced relation with the member 14, being held against outward movement by any suitable means, such as the collar 17. The inner opposed sides of the members 14 and 16 are provided with gear teeth 18 with which pinions 19 mesh at diametrically opposite points, these pinions being mounted on axes at right angles to the axis of the shaft 2. In the construction shown, screws 20 form the shafts upon which the pinions 19 rotate and the inner ends of these screws pass through a pinion carrier 21 and are threaded into the axle 2. By this or a similar arrangement, it will be seen that if the member 14 is normally held against rotation, rotation of the pinions 19 about the axis of the shaft 2, will cause these pinions to roll upon the gear teeth 18 of said member 14, which in turn causes rotation of the sprocket 16. It will also be seen that if the member 14 is turned in one direction, the sprocket 16 will be advanced, while if said member 14 is turned in the other direction, the sprocket will be retarded. This advancing or retarding is directly transmitted to the shaft 12, as the sprocket 16 drives this shaft, by means of a sprocket chain 22, a sprocket 23 on the shaft 12 around which said sprocket chain is trained, and a suitable clutch 24 for connecting said sprocket 23 with the shaft 12 or freeing it from driving connection therewith. In the present showing, the sprocket 23 is freely slidable and rotatable upon the shaft 12 and has suitable running engagement 25 with a bell crank lever 26 which is instrumental in throwing the clutch 24 out, a spring 27 being preferably employed to normally shift the sprocket 23 in a direction to hold the clutch in operative condition.

In the form of construction shown, the bell crank lever 26 carries a spring-pressed dog 28 which engages a ratchet wheel 29 on the shaft 12, when said lever is moved in a direction to release the clutch 24. A backward kick of the shaft 12 under the influence of the springs 10, is thus prevented, which prevents improper operation of the marking arms 6. Normally, the spring 27, in holding the clutch 24 in operative condition, spaces the dog 28 away from the ratchet wheel 29 as shown in Fig. 2. The operating means whereby the lever 26 is moved to throw the clutch out and engage the dog 28 with the ratchet wheel 29 will be hereinafter fully described.

In the foregoing, we have referred to certain turning of the hub member 14 about the axle 2 and to normally holding this member against rotation. While these results might be obtained by numerous mechanisms, we prefer to employ the construction shown.

A control device, here shown in the form of a foot lever 30, is pivoted upon the outer end portion of the hub member 14 and is held against outward movement by a collar 31 or other desired means. In the preferred form of construction, a worm 32 is rotatably mounted on the foot lever 30 and engages the worm teeth 33 on the hub member 14, said worm being provided with a flexible operating shaft 34 having a hand wheel 35 at its upper end, a suitable guide bearing 36 being mounted at any desired point on the machine to receive said shaft. Means yet to be described, holds the lever 30 normally against movement and it will thus be seen that by rotating the hand wheel 35, the hub member 14 may be turned in either direction to either advance or retard the sprocket 16 and consequently the shaft 12. Also, it will be obvious that by vertically moving the lever 30, without turning the hand wheel 35, similar results can be obtained.

We provide a novel association of parts, whereby movement of the lever 30 may be utilized to control the bell crank 26, thus controlling the clutch 24. In the preferred form of construction, an arm 40 rises rigidly from the front end of the foot lever 30 and is connected by a longitudinal rod 41 with a collar 42 on the longitudinally slidable rod 43 which is disposed at right angles to the axle 2 and the shaft 12, the rear end of said rod being mounted in an appropriate bearing 44 which may well be secured to the tongue 45 of the machine, while a similar bearing 46 is provided for the front end of the rod, the last named bearing preferably having a rearwardly extending track 47 which the long arm of the bell crank lever 26 engages to prevent downward swinging of said arm when the dog 28 engages the ratchet wheel 29. A coiled spring 48 having greater strength than the spring 27 is interposed between the bearing 44 and the collar 42 and exerts a normal forward stress upon the rod 43, tending to move a second collar 49 on the rod into contact with the lever 26 so as to move the latter and hold the clutch 24 out of operation, while at the same time retaining the dog 28 in engagement with the ratchet wheel 29. By depressing the lever 30 sufficiently however, it will be seen that the collar 49 permits the lever 26 to act under the influence of the spring 27, thereby throwing the clutch into play.

From the foregoing taken in connection with the accompanying drawings, it will be seen that we have provided a simple and efficient mechanism for either driving the shaft 12 continuously or for holding said shaft against turning, and for either advancing or retarding said shaft to properly set the marking arms 6.

As excellent results may be obtained from the details disclosed, these details are preferably followed, but within the scope of the invention as claimed, numerous minor changes may be made.

We claim:

1. A mechanism of the class described comprising driving means including a power take-off member and a control device for advancing or retarding said power take-off member, driving connections operated by said power take-off member and including a clutch, and clutch operating connections between said control device and said clutch.

2. A structure as specified in claim 1; said clutch operating connections including a lost motion connection having a predetermined amount of idle movement before becoming effective, permitting movement of said control device within limits without operating said clutch.

3. A structure as specified in claim 1; said clutch operating connections including a lever connected with the clutch, and a rod having a sliding connection with said lever.

4. A mechanism of the class described, comprising driving means including a power take-off member and a control device for advancing or retarding said power take-off member, driving connections operated by said power take-off member and including a clutch, a member driven by said driving connections, clutch operating connections between said control device and said clutch, and means actuated by said clutch operating connections for holding said driven member against turning when the clutch is thrown out.

5. A structure as specified in claim 4; said holding means being carried by an element of said clutch operating connections.

6. A mechanism of the class described comprising driving means including a power take-off member and a control device for advancing or retarding said power take-off member, driving connections operated by said power take-off member and including a clutch, a member driven by said driving connections and having a toothed wheel, operating connections between said control device and said clutch, including a lever adjacent said toothed wheel, and a dog on said lever engageable with said toothed wheel when the clutch is thrown out.

7. A mechanism of the class described comprising a drive shaft, a driven shaft parallel thereto; driving connections between the two shafts including a clutch on the driven shaft and gearing on the drive shaft having a control device for advancing or retarding said driven shaft, and clutch operating connections between said clutch and said control device, including a lost motion connection permitting certain adjustment of said gearing without affecting the clutch.

8. A structure as specified in claim 7; said clutch operating connections including a rod movable at right angles to said shafts, and a lever connected with the clutch and having a sliding connection with said rod.

9. A structure as specified in claim 7; together with means actuated by said clutch operating connections for holding said driven shaft when the clutch is thrown out.

10. A structure as specified in claim 7; said clutch operating connections including an element movable toward said driven shaft when the clutch is thrown out, a toothed wheel on said driven shaft, and a dog on said element to engage said toothed wheel when said element moves toward said driven shaft.

11. A mechanism of the class described comprising a normally stationary member capable of turning about an axis, a control lever fulcrumed co-axially with said member, means for connecting said member with said lever and for turning the former at will with respect to and without movement of the latter, a rotatable member spaced from and co-axial with said stationary member and adapted for driving a machine element, a pinion carrier between said members adapted to be continuously rotated about the common axis thereof, and a pinion rotatably mounted on said carrier, said pinion being in operative engagement with both of said members.

12. A structure as specified in claim 11; said connecting and turning means comprising a rotatable worm carried by said lever and worm teeth on said relatively stationary member meshing with said worm.

13. A mechanism of the class described comprising a rotatable member and driving means therefor including a clutch, a toothed wheel on said rotatable member adjacent said clutch, means associated with said clutch for throwing the latter into and out of operation, and means operated by said last named means for engaging said toothed wheel when the clutch is thrown out.

14. A mechanism of the class described comprising a rotatable member and driving means therefor including a clutch, a toothed wheel on said rotatable member adjacnt said clutch, operating means for said clutch including a movable member in proximity to and movable toward and from said toothed wheel, and holding means on said movable member for engagement with said toothed wheel when the clutch is thrown out.

15. A mechanism of the class described comprising a rotatable member and driving means therefor including a clutch, a control device for said clutch, operating connections between said control device and said clutch including a lever adjacent said rotatable member, a toothed wheel on said member, and a dog carried by said lever to engage said toothed wheel when the clutch is thrown out.

In testimony whereof we have hereunto affixed our signatures.

CHARLES D. HARNESS.
CHARLES D. BRADHSAW.